(12) United States Patent
Wang

(10) Patent No.: US 7,092,521 B2
(45) Date of Patent: Aug. 15, 2006

(54) FIXED BASE ASSEMBLY OF MOBILE PHONE

(76) Inventor: Chin Yang Wang, No. 24-110, Shao An Tsu, Pai Ho Town, Tainan Hsien (TW)

(*) Notice: Subject to any disclaimer, the term of this patent is extended or adjusted under 35 U.S.C. 154(b) by 387 days.

(21) Appl. No.: 10/759,057

(22) Filed: Jan. 20, 2004

(65) Prior Publication Data

US 2005/0157869 A1 Jul. 21, 2005

(51) Int. Cl.
*H04M 1/00* (2006.01)
*H04M 9/00* (2006.01)
*H04B 1/38* (2006.01)
*H05K 11/02* (2006.01)

(52) U.S. Cl. ............ 379/455; 379/428.01; 455/575.9; 455/345

(58) Field of Classification Search ............... 379/428.1–428.04, 449, 454, 455; 455/345, 455/346, 575.9
See application file for complete search history.

(56) References Cited

U.S. PATENT DOCUMENTS

| 6,134,421 A * | 10/2000 | Lee et al. ................ 455/575.9 |
| 6,647,248 B1 * | 11/2003 | Ortscheid et al. ........... 224/255 |
| 2004/0086112 A1 * | 5/2004 | Hilger et al. ............... 379/455 |

* cited by examiner

*Primary Examiner*—Benny Tieu
(74) *Attorney, Agent, or Firm*—Bacon & Thomas

(57) ABSTRACT

The present invention is to provide a fixed base assembly of mobile phone comprising a base, a cylinder extended upward from the center of the top of the base having one end coupled to a connecting rod, and the other end of the connecting rod able to clamp a mobile phone, wherein the bottom of the base is hollow and connected to the inside of the cylinder, such that the base can be slid, expanded, or contracted up and down along the cylinder. In addition, a clicking member is extended from the cylinder and the base, and the pivotal end of the clicking member symmetrically has a circular protruded head section such that when the clicking end of the clicking member is pressed, the head section of the clicking member presses against the surface of the base to lift the sucking disc of the cylinder, and make the bottom of the sucking disc vacuum and attached onto a fixed object.

4 Claims, 5 Drawing Sheets

FIXED BASE ASSEMBLY OF MOBILE PHONE

BACKGROUND OF THE INVENTION

I. Field of the Invention

This invention relates to a fixed base assembly of mobile phones.

II. Description of the Prior Art

In the fast changing and highly efficient environment nowadays, electronic communications products (such as a mobile phone) have become a convenient and efficient communications tool. Since mobile phones are usually placed at a position according to the user's need (such as being hung at the user's waist or neck, or put in a backpack, a bag, or a car, etc.) and such position varies with the actual situation, therefore, it generally requires a fixed base to fix the mobile phone. In the example of putting the mobile phone in a car, the mobile phone is clamped and fixed to one end of a clamping base of the fixed device, and the other end of the fixed device is disposed at an appropriate position in the car, so that the driver can feel relieved and concentrate on driving.

However, since there are various designs for the fixed device of mobile phones in the market, therefore a prior-art fixed device which can be attached onto any fixed object in the car (such as a drink holder or a car window, etc) is used for example. Please refer to FIGS. 1 and 2 for the prior-art fixed device. Such fixed device 10 has a base 11 which is a cone symmetrical along the circumference and comprises a hollow cylinder 12 extended upward from the center of the top of the base 11, and a pair of corresponding small and large apertures 121, 122 respectively extended upward from the cylinder 12 and the cone, and the bottom of the cone is hollow, and a stop rod 123 is disposed at the bottom of the large aperture 122 in the cylinder 12.

Further, the hollow of the bottom of the cone allows the base 11 to be movably coupled to a sucking disc 13, and the diameter of the sucking disc 13 is slightly larger than or equal to the external diameter of the bottom of the base 11. A bar-shaped pillar is extended upward from the center of the bar-shaped pillar 131, and a channel 132 is disposed on the pillar 131 such that the stop rod 123 in the bottom of the base 11 can be guided into the channel 132 to successfully slide the base 11 onto the sucking disc 13, and the outer periphery of the bar-shaped pillar 131 is surrounded by a spring 133.

Further, there is a clicking member 14, which has a head section 141 to be extended into the large aperture 122 of the cylinder 12 and the channel 132 of the pillar 131 of the sucking disc 13, and pivotally coupled to the small aperture 121 by a peg 15. One end of the cylinder 12 of the base 11 is coupled to a connecting rod 16, and the other end of the connecting rod 16 is disposed on a clamping base 161 which is used for clamping the mobile phone.

Therefore, if the exposed end 142 of the clicking member 14 is pressed as shown in FIG. 2, the head section 141 presses against the stop rod 123 to compress the spring 133 such that the hollow at the bottom of the base 11 presses on the sucking disc 13 to constitute a vacuum and attaches the bottom of the base 11 onto the sucking disc 13 tightly. The sucking disc 13 will contract inward as the hollow at the bottom of the base 11 is attached by the sucking disc 13 and the sucking disc is further attached securely onto any fixed object in the car. On the other hand, if the exposed end 142 of the clicking member 14 is lifted such that after the force of the head sections 141 pressing against the stop rod 123 is gone, the bottom of the base 11 is lifted and separated from the sucking disc 13 due to the resilience of the spring 133. Therefore, the fixed device 10 can be removed successfully.

Although the way of using the base 11 and the sucking disc 13 of the fixed device 10 to work together with the clicking member 14 can attach the sucking disc 13 securely onto a fixed object and fix the mobile phone onto another end of the fixed device 10, the structures of the large aperture 122 on the cylinder 12 of the base 11, the stop rod 123 at the bottom and the sucking disc 13 of the pillar 131, the channel 132 on the pillar 131, and the clicking member 14, etc not only are complicated, but also carry a high manufacturing cost, and make the overall assembling very complicated and laborious. Furthermore, the clicking member 14 will break easily when it has been used for a long time, and has the shortcomings of causing the base 11 unable to operate and to be attached to the sucking disc 13. Therefore, it has a poor stability which definitely affects the utility of the fixed device 10.

SUMMARY OF THE INVENTION

In view of the shortcomings of the aforementioned conventional fixed device which has a base, a sucking disc, and a clicking member, etc. on one end including the complicated structure, high mold manufacturing cost, overall complicated assembling procedure, easily broken clicking member, and inoperable base and sucking disc, etc, the inventor of the present invention based on years of experience and technologies in the mobile phone earphone industry, and conducted extensive researches and experiments to solve the problems and overcome the shortcomings, and finally invented the "Fixed base of mobile phone" in accordance with this invention. By this invention, the aforementioned shortcomings of the prior can be overcome.

The primary object of the invention is to provide a mobile phone fixed base with simple structure, easy-to-make mold, fast assembling, and low cost features. The fixed base comprises a base, a cylinder extended upward from the center of the top of the base, and one end of the cylinder is coupled to a connecting rod, and the other end of the connecting rod can clamp the mobile phone. Further, the bottom of the base is hollow and connected to the inside of the cylinder, such that the base can be slid, expanded, or contracted up and down along the cylinder. In addition, a clicking member is extended from the cylinder and the base, and the pivotal end of the clicking member symmetrically has a circular protruded head section such that when the clicking end of the clicking member is pressed, the head section of the clicking member presses against the surface of the base to lift the sucking disc of the cylinder, and further make the bottom of the sucking disc vacuum and to be attached onto a fixed object. On the other hand, if the clicking end of the clicking member is lifted, the force of the head section of the clicking member pressing against the surface of the base will be eliminated, such that the sucking disc of the cylinder will displace downward due to the resilience of the spring, and thus separating the sucking disc. Therefore, a fixed base can be easily attached to or removed from a fixed object.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DESCRIPTION OF THE PREFERRED EMBODIMENT

Figure 3:
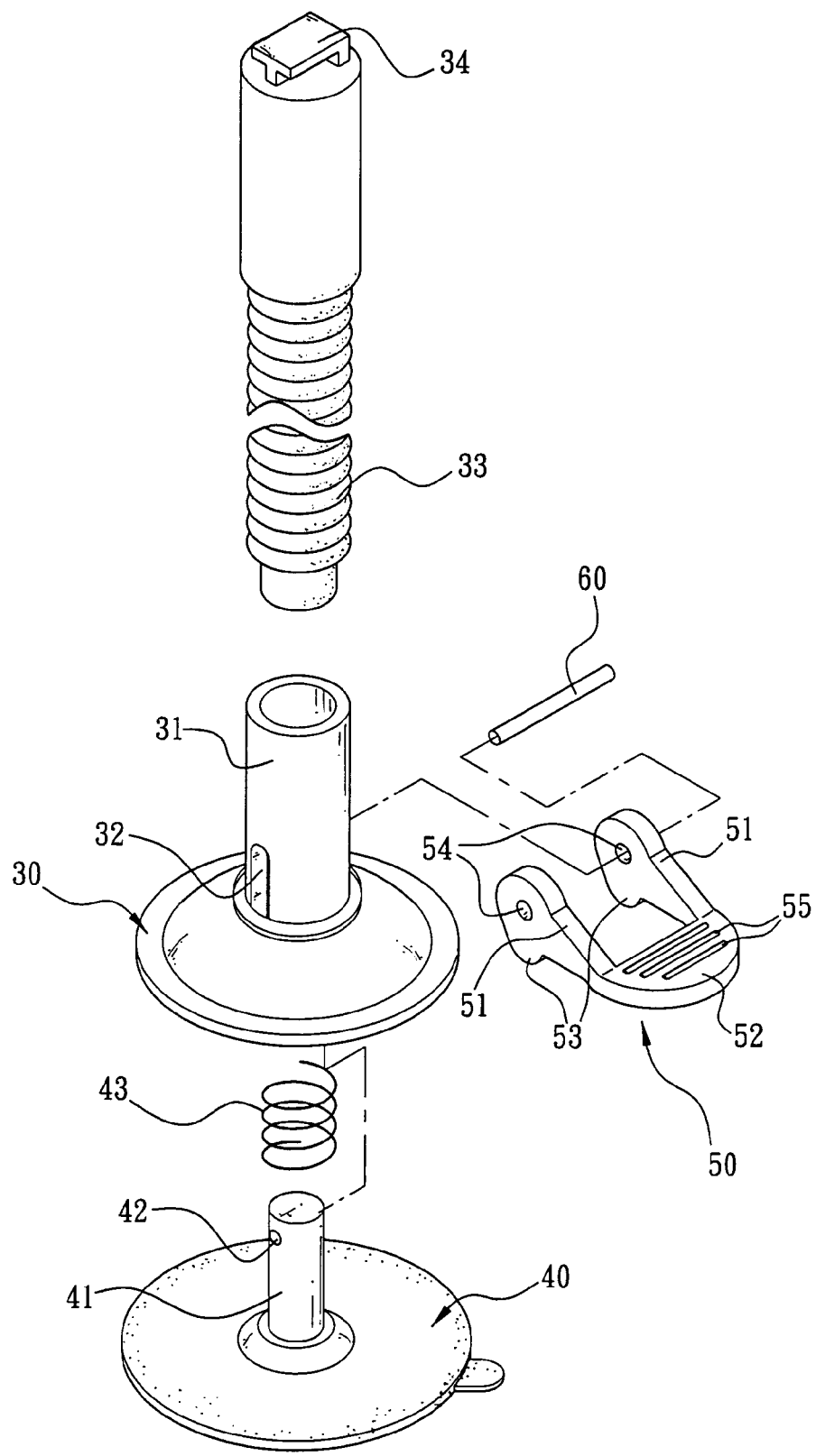
FIG. 3 is a perspective view of the disassembled parts of the structure of a fixed base according to the present invention.

Please refer to FIG. 3 for the fixed base assembly of the mobile phone according to the present invention. In the figure, the fixed base comprises a base 30, a sucking disc 40, and a clicking member 50; wherein the base 30 is a cone symmetrical along the circumference; a hollow cylinder 31 is extended upward from the center of the top of the cone; a pair of corresponding rectangular through holes 32 is extended upward respectively from the cylinder 31 and an extended position of the cone; a hollow is disposed at the bottom of the cone; the hollow and the cylinder 31 are interconnected; the top of the cylinder 31 of the base 30 is coupled to a connecting rod 33, and the other end of the connecting rod 33 has a clamping base 34, and the clamping base 34 is used to clamp the mobile phone or digital personal assistance (PDA) (not shown in the figure).

Please refer to FIG. 3 again. The hollow at the bottom of the cone can slide the base 30 onto the sucking disc 40, and the external diameter of the sucking disc 40 is slightly greater than (or equal to) the external diameter of the bottom of the base 30. A bar-shaped pillar 41 is extended upward from the center of the sucking disc 40, such that the pillar 41 can be guided into the cylinder 31 from the hollow at the bottom of the base 30, and the base 30 can be slid and disposed successfully onto the sucking disc 40, and a spring 43 is sheathed around the periphery of the bar-shaped pillar 41, such that the base 30 can expand or contract up and down along the pillar 41. Further, a through hole 42 is disposed along the diameter of the pillar 41.

Please refer to FIG. 3 again. The clicking member 50 is pivotally disposed on the rectangular through hole 32 at the extended section of the cylinder 31 and the base 30. The pivotal connecting end of the clicking member 50 has a pair of two corresponding arm sections 51; the other end has a clicking end 52; the ends of two arm sections 51 symmetrically disposed on a circular protruded section 53; the two arm sections 51 also has a through hole 54 corresponding to the rectangular through hole 32, so that a peg 60 is inserted into the through hole 54 of the arm section 51, two rectangular through holes 32 responding to the cylinder 31, and the through hole 42 of the cylinder 31 of the sucking disc 40, such that the sucking disc pillar 41, clicking member 50, and base 30 are pivotally coupled.

Figure 4:
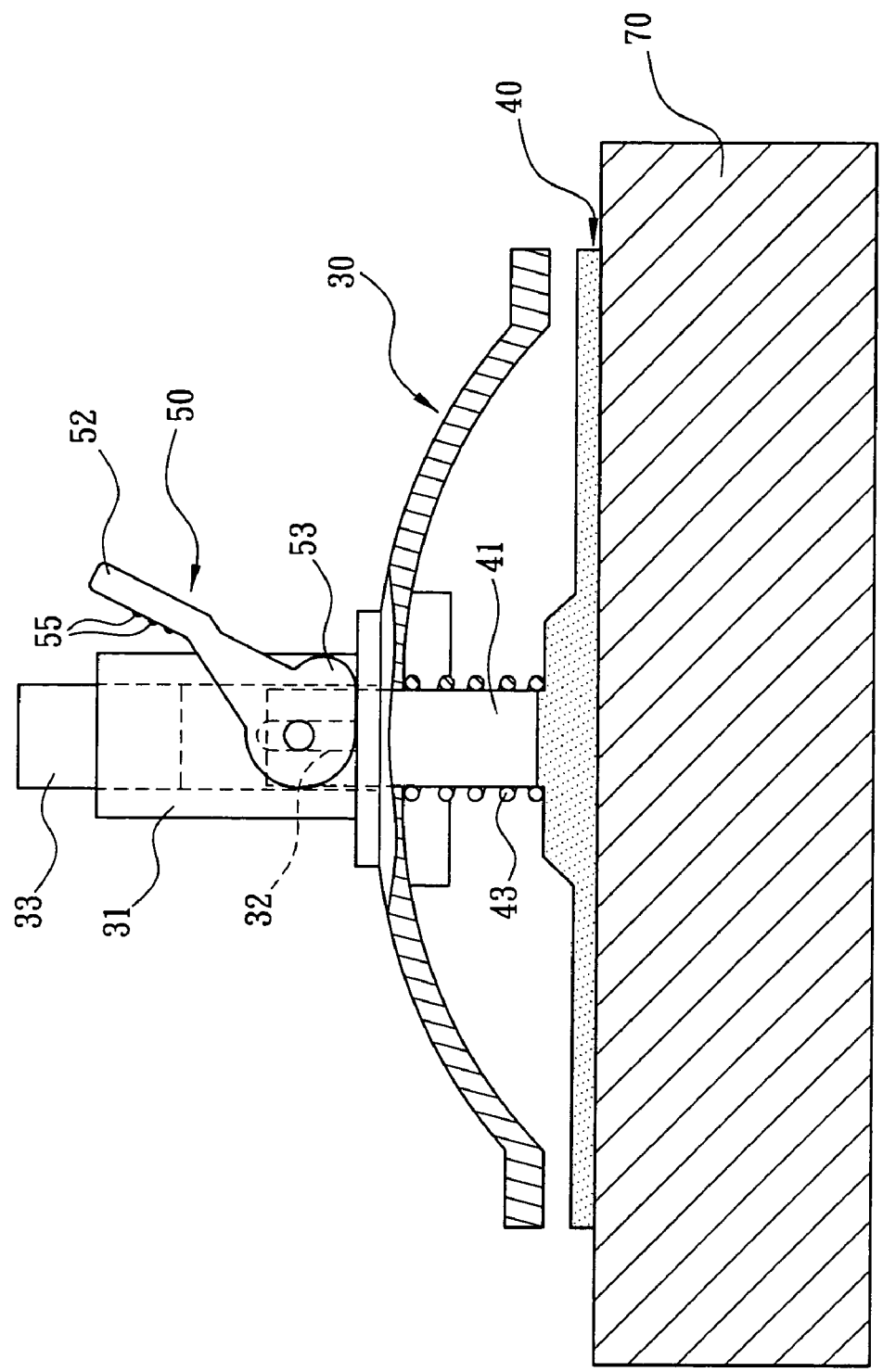
FIG. 4 is a cross-sectional view of part of the movements of the fixed base according to the present invention.
Figure 5:
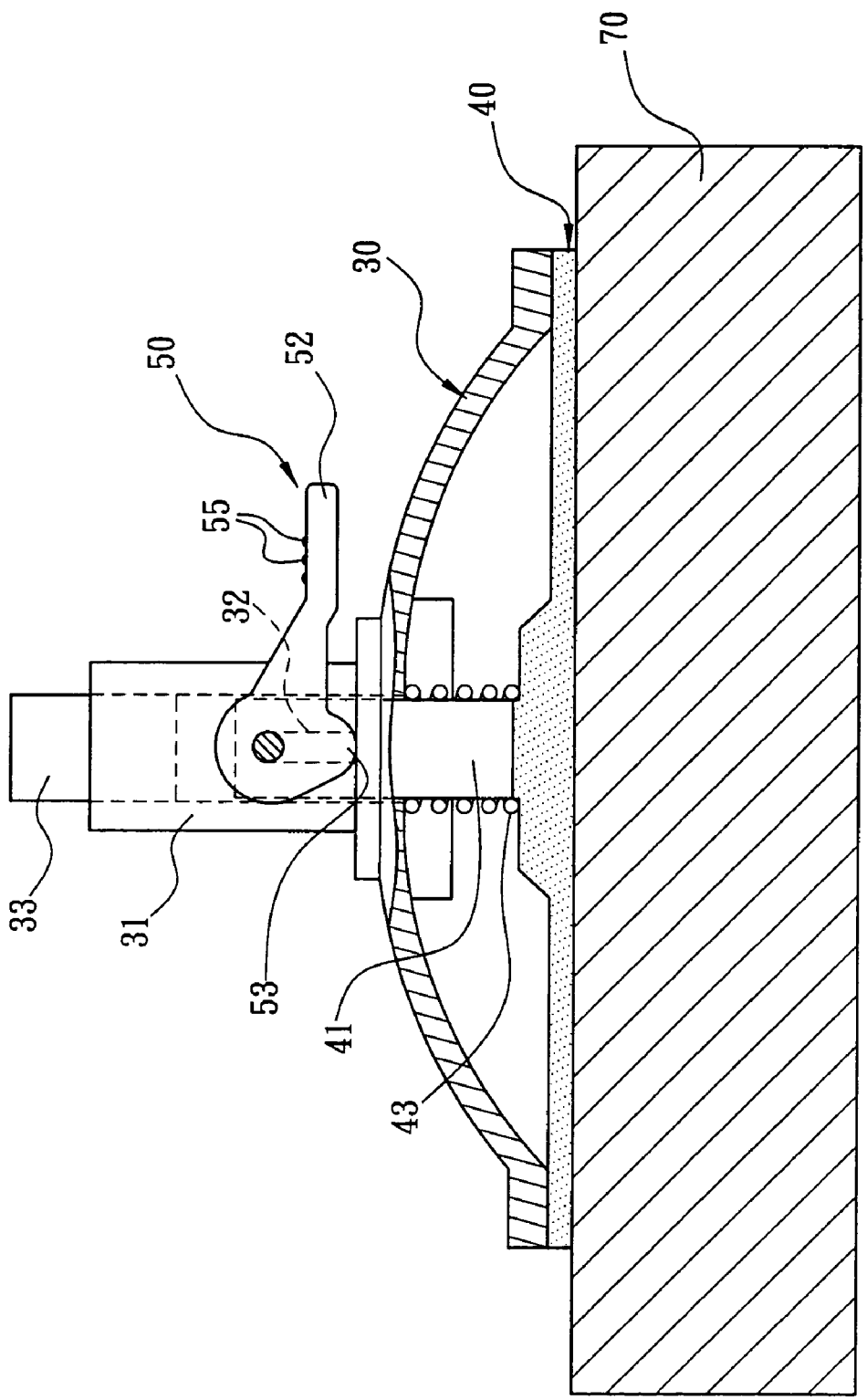
FIG. 5 is another cross-sectional view of part of the movements of the fixed base according to the present invention.

Please refer to FIGS. 4 and 5 for the aforementioned assembly of components. When the fixed base is fixed onto a fixed object 70 (such as a cup holder, or a car window, etc), the clicking end 52 of the clicking member 50 is pressed, and the protruded head section 53 of the clicking member 50 presses against the surface of the base 30 to lift the sucking disc pillar 41 and make the central surface of the bottom of the sucking disc 40 vacuum and to be attached onto a fixed object 70.

Please refer to FIGS. 4 and 5 again. On the other hand, when the clicking end 52 of the clicking member 50 is lifted, the force of the protruded head section 53 of the clicking member 50 pressing against the surface of the base 30 will be eliminated, such that the sucking disc pillar 41 will displace downward due to the resilience of the spring 43, so that the sucking disc 40 will be separated, and the fixed base can be easily removed from the fixed object 70.

Further, please refer to FIG. 3. A plurality of protruded bars 55 is disposed equidistant apart with each other on the surface of the clicking end 52 of the clicking member 50 for enhancing the frictional force and holding the clicking end 52, so that the clicking end 52 will not slip off from the user's hand easily.

Figure 1:
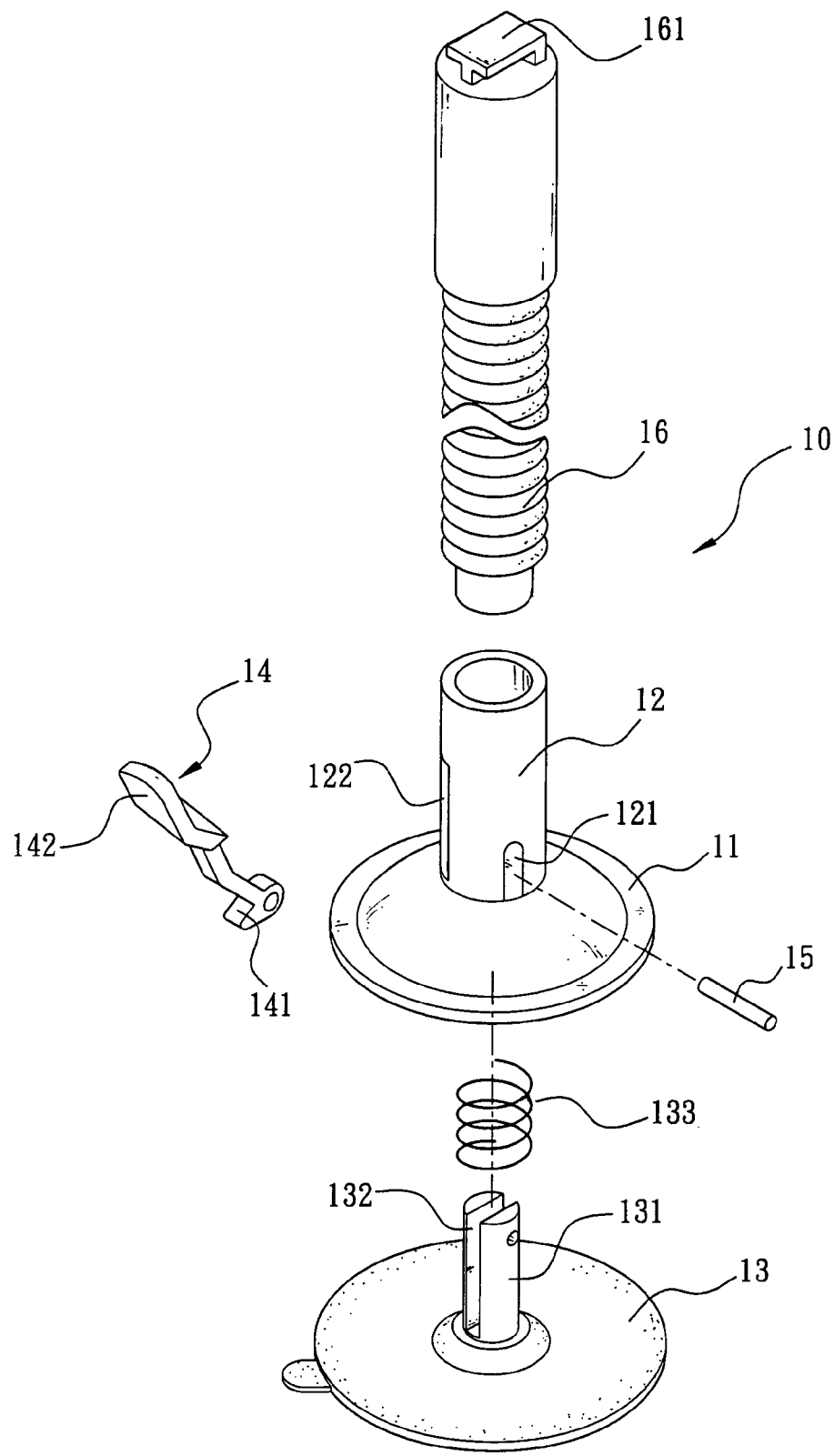
FIG. 1 is a perspective view of the disassembled parts of the structure of a prior-art fixed device.
Figure 2:
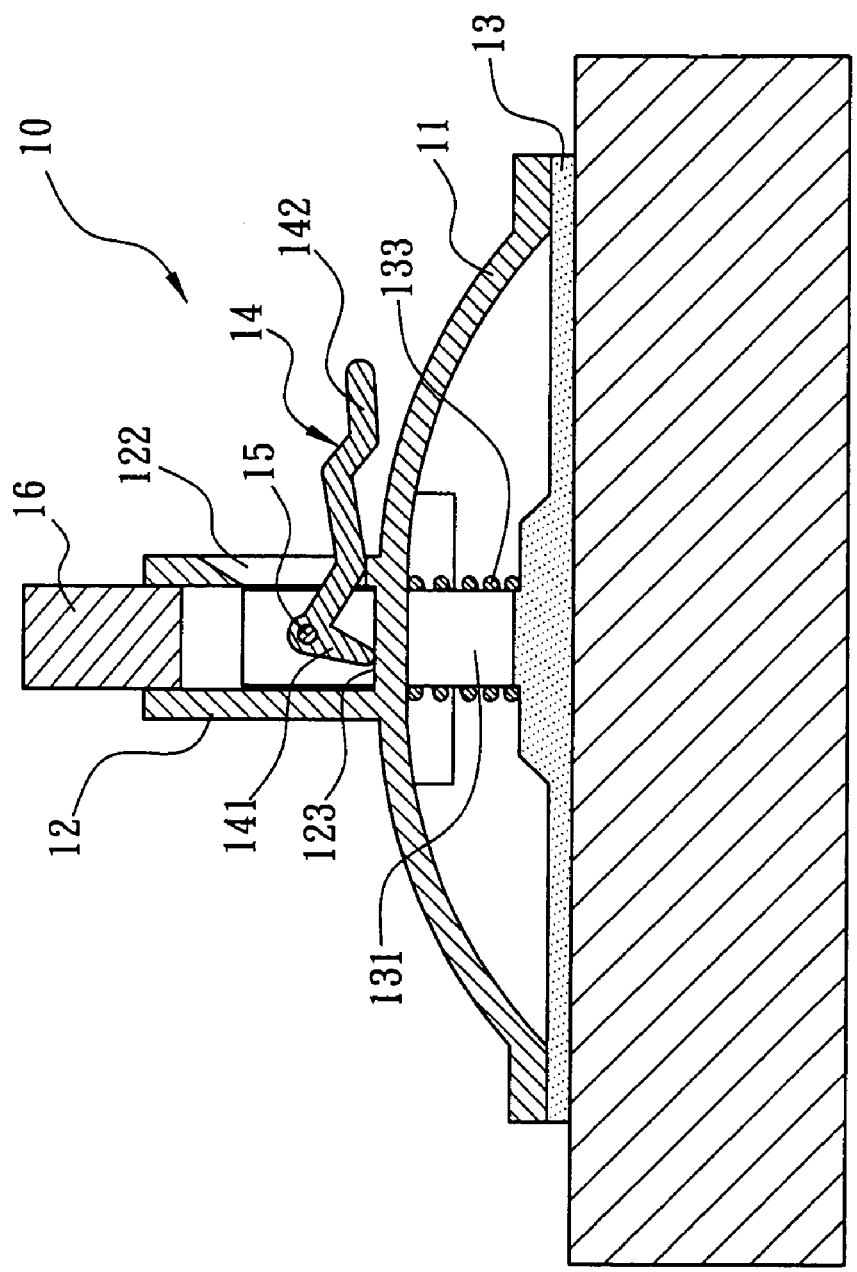
FIG. 2 is a cross-sectional view of part of a prior-art fixed device.

In summation of the description above, the most significant feature of this invention resides on the simple design of the structures of the base 30, sucking disc 40, and clicking member, not only having the advantages of the easy-to-make mold, simple assembling, and low manufacturing cost, but also having a very strong structure of clicking member 50, which can prevent the cracking of the clicking member 50 as the traditional clicking member 14 (as shown in FIG. 1) usually breaks after being exerted with a larger clicking force and used for a long time. Thus, this invention can give the best using condition in a long-time use, and the design of this invention can effectively overcome the shortcomings of the traditional device. This invention is regarded as an excellent design.

What is claimed is:

1. A fixed base assembly of mobile phone, comprising:
   a base, having a hollow cylinder extended upward from the center of the top of said base, a pair of corresponding rectangular through holes being disposed respectively at an extended position of said cylinder and base, such that the bottom of said base being a hollow, and said hollow and said cylinder being interconnected, and the top of said cylinder being coupled to a connecting rod, and one end of said connecting rod being used for clamping a mobile phone;
   a sucking disc, having an external diameter slightly larger than or equal to the external diameter of the bottom of said base, and a bar-shaped pillar being extended upward from the center of said sucking disc, such that said base being slidably disposed on said sucking disc, and a spring surrounding the periphery of said bar-shaped pillar, such that said base being capable of sliding by expanding and contracting up and down along said pillar, and said pillar comprising a through hole along the direction of the diameter;
   a clicking member, being coupled to said cylinder and a rectangular through hole at the extended position of said base, and having a pair of corresponding arm sections disposed at a pivotal coupling end of said clicking member, and the other end being a clicking end, and one side of both ends of said two arm sections symmetrically having a circular protruded head section, and a through hole corresponding to said rectangular through hole being disposed on said two arm sections, so that a peg being inserted into said through hole of each of said arm sections, said pair of corresponding rectangular through holes of said cylinder, and said through hole of said sucking disc pillar, so that said sucking disc pillar, said clicking member, and said base being pivotally coupled.

2. The fixed base assembly of mobile phone of claim 1, wherein said clicking member at its clicking end comprises a plurality of protruded bars being disposed equidistant from each other, so that said protruded bars enhance the friction at said clicking end and prevent said clicking end from slipping off.

3. The fixed base assembly of mobile phone of claim 1, wherein said base is a cone symmetrically along the circumference.

4. The fixed base assembly of mobile phone of claim 1, wherein said connecting rod at another end comprises a clamping base for clamping a mobile phone.

* * * * *